(12) United States Patent
Honea

(10) Patent No.: US 7,163,225 B2
(45) Date of Patent: Jan. 16, 2007

(54) FOOT PEG

(76) Inventor: Michael Alan Honea, 1721 Kent Ave., Lodi, CA (US) 95242

( * ) Notice: Subject to any disclaimer, the term of this patent is extended or adjusted under 35 U.S.C. 154(b) by 185 days.

(21) Appl. No.: 11/059,937

(22) Filed: Feb. 16, 2005

(65) Prior Publication Data

US 2006/0181055 A1   Aug. 17, 2006

(51) Int. Cl.
  *B62H 1/00* (2006.01)
(52) U.S. Cl. .......................... 280/291; 74/564
(58) Field of Classification Search ............. 280/288.4, 280/291, 293, 294; 74/564
  See application file for complete search history.

(56) References Cited

U.S. PATENT DOCUMENTS 6,663,129 B1 * 12/2003 Smith .......................... 280/291
6,957,821 B1 * 10/2005 Gorman et al. ............. 280/291

* cited by examiner

*Primary Examiner*—Lesley D. Morris
*Assistant Examiner*—Il. Lum
(74) *Attorney, Agent, or Firm*—Tope-McKay & Associates

(57) ABSTRACT

Described is a foot peg with a roller for attaching with a cycle. The foot peg comprises a roller, a rigid housing, and a support member. The roller includes an axial length with a hole passing through the roller along the axial length. The rigid housing is formed to be attached with a cycle and cover a portion of the roller. When attached proximate the roller, the rigid housing covers a covered portion of the roller, leaving an uncovered portion of the roller exposed. The support member is formed to be attached with the rigid housing and extend through the hole of the roller, thereby attaching the roller proximate the housing. When the foot peg is attached with a cycle, a user may stand upon the rigid housing and/or use the uncovered portion of the roller to roll the cycle across an obstacle.

28 Claims, 9 Drawing Sheets

FOOT PEG

FIELD OF INVENTION

The present invention relates to a foot peg and more particularly, to a foot peg that can be attached with a cycle, allowing a user to roll the cycle across an obstacle and/or place a foot upon the foot peg.

BACKGROUND OF INVENTION

Outdoor sports have become increasingly popular. With their popularity, enthusiasts have sought ways to further challenge themselves and the sport. For example, bicycles, once used solely for transportation, are now a main attraction at competitive sporting events and are very popular for performing tricks.

Bicycle riders have created ramps and other structures to perform jumps and tricks. As the ability of riders has increased, bicycle enthusiasts have been devising ways to improve the performance of their cycles, allowing them to perform additional and more complex tricks. For example, handle bars are now capable of being spun in a circle, allowing a user to ride a wheelie and spin his handlebars in a circle.

Another innovation was the foot peg. The foot peg screws onto the wheel axle and up against the bicycle forks. With advent of the foot peg, bicycle enthusiasts are now able to perform a myriad of tricks, enabling the rider to perform tricks while standing on the foot peg, or allowing a second passenger to ride on the foot pegs. The foot peg has also allowed the rider to skid across surfaces while supporting the weight of the bicycle on the foot peg. Although functional for such tricks, the foot peg creates substantial friction while skidding across a surface, thereby slowing down the bike. None of the foot pegs heretofore designed allows a user to roll across a surface without substantial abrasion.

Thus, a continuing need exists for a foot peg that allows a user to place the foot peg on a surface and roll smoothly across the surface, while also allowing the user to stand upon the foot peg.

SUMMARY OF INVENTION

The present invention relates to a foot peg for attaching with a cycle. The foot peg comprises a roller, a rigid housing, and a support member. The roller includes an axial length with a hole passing through the roller along the axial length. The rigid housing is for attaching with a cycle and covering a portion of the roller, and is formed such that when attached proximate the roller, it covers a covered portion of the roller, leaving an uncovered portion of the roller exposed. The support member is for attaching with the rigid housing and extending through the hole of the roller, thereby attaching the roller proximate the housing. When the foot peg is attached with a cycle, a user may stand upon the rigid housing or use the uncovered portion of the roller to roll the cycle across an obstacle.

In another aspect, the foot peg includes only the roller and support member for attaching with a cycle. In this aspect, a user may use the roller to roll the cycle across an obstacle.

In another aspect, the roller is an item selected from a group consisting of a bearing and an elongated roller. When an elongated roller, the elongated roller is formed of a material selected from a group consisting of ultra-high molecular weight polyethylene (UHMW), metal, Teflon, and plastic.

In yet another aspect, the support member is an elongated nut with a receiving-end for receiving a bolt therein.

Additionally, the rigid housing is formed such that it encases and covers at least fifty percent of the roller Furthermore, the rigid housing includes a foot portion and an attachment portion attached substantially perpendicularly to the foot portion. The attachment portion includes a space for a bolt to pass therethrough to be attached with the support member, thereby securing the foot peg with the cycle.

In another aspect, the foot portion includes an outer gripping surface for engaging with a user's foot to prevent slippage.

In another aspect, the attachment portion further includes at least one foot peg stabilizer for connecting with an anti-rotation device, where the anti-rotation device is for connecting with a fork of a cycle, such that when connected with the anti-rotation device and the fork, the rigid housing is secured in place and prevented from spinning around the roller.

In yet another aspect, the present invention further comprises an anti-rotation device for attaching with the attachment portion and interacting with a cycle's fork.

Additionally, the support member includes an outer surface with at least one groove. At least one item placed within the at least one groove to improve the rolling ability of an attached roller. The at least one item is selected from a group consisting of a lubricant and a bearing.

Finally, it can be appreciated by one in the art that the above summary of the foot peg is not meant to be limiting and can be applied to various aspects of the present invention, such as a kit and method for forming, building, and using the same, where each individual part is formed and configured to be connected with the respective connecting part.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
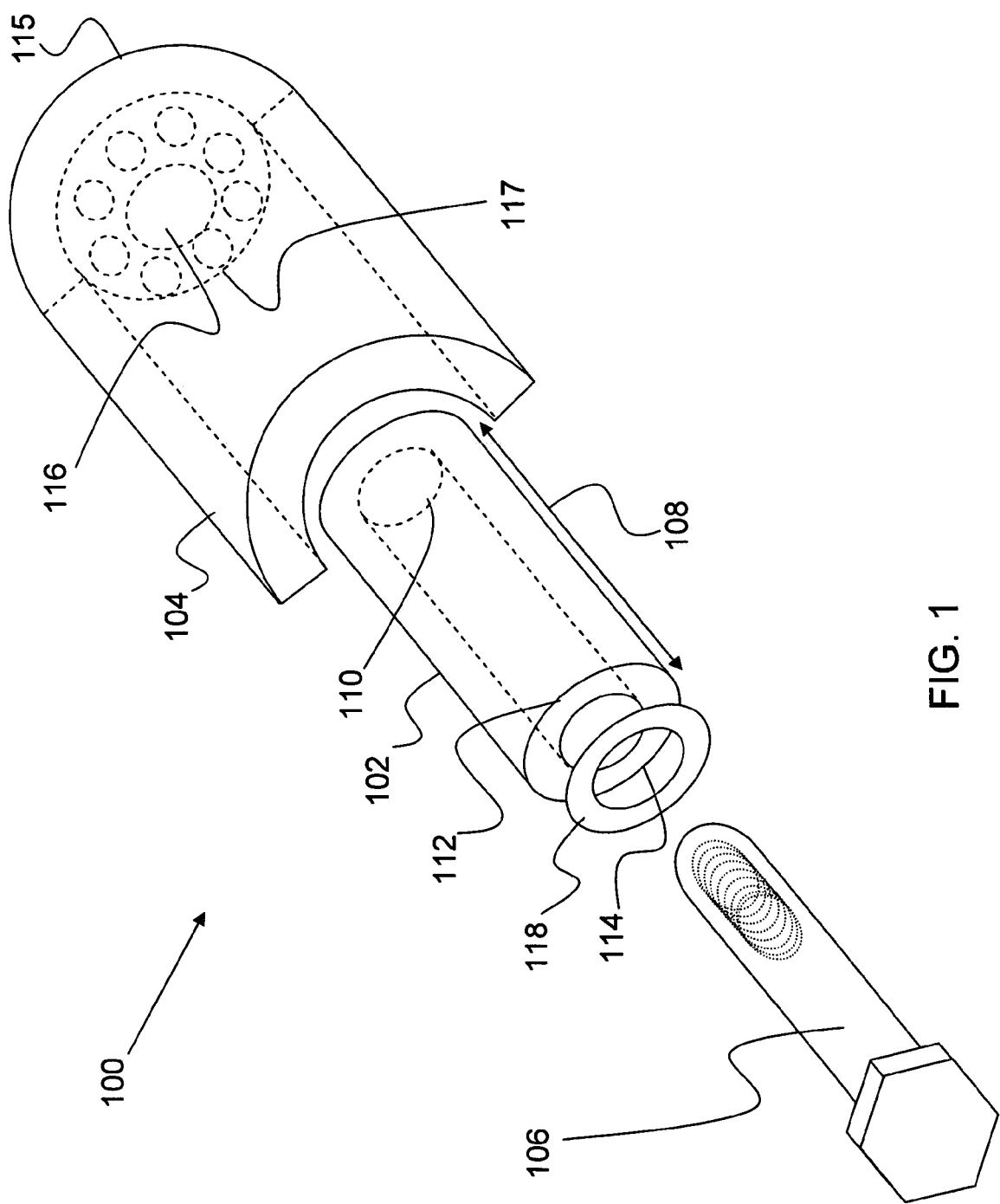
FIG. 1 is an illustration of a foot peg and its corresponding parts according to the present invention.

The present invention relates to a foot peg and more particularly, to a foot peg that can be attached with a cycle, allowing a user to place a foot upon the foot peg. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first an introduction is provided to provide the reader with a general understanding of the present invention. Next, a description of various aspects of the present invention is provided to give an understanding of the specific details.

(2) Introduction

Foot pegs have been invented that screw onto a cycle's wheel axle and up against the cycle forks. The foot pegs enable a rider to perform tricks while standing on the foot peg, or allow a second passenger to ride on the foot pegs. The foot pegs are also often used to skid across surfaces while supporting the weight of the cycle and rider on the foot peg. A problem with current foot pegs however is that they do not include any rolling mechanism, causing the foot peg to skid across the surface and thereby slow down the bike.

The present invention solves this problem by incorporating a roller into the foot peg. With the roller, a user may roll smoothly across the surface, while also allowing the user to stand upon the foot peg. Specific details of the present invention are described in further detail below.

(3) Description

The present invention relates to a foot peg for attaching with a cycle. The term "cycle" as used with respect to this invention refers to a bicycle, motorcycle, or a similar vehicle that includes wheels. As shown in FIG. 1, the foot peg 100 includes a roller 102, a rigid housing 104, and a support member 106. The roller 102 has an axial length 108 with a hole 110 passing through the roller 102 along the axial length 108. The rigid housing 104 is formed such that when attached proximate the roller 102, it covers a covered portion 112 of the roller 102, leaving an uncovered portion 114 of the roller 102 exposed. The rigid housing 104 also includes a foot portion 115 and an attachment portion 117 attached substantially perpendicularly to the foot portion. The attachment portion 117 includes a housing space 116 for a bolt to pass therethrough to be attached with the support member 106, as described in further detail below. The housing space 116 may be a hole formed through the attachment portion 117, or may be a notch in the attachment portion 117 such that a bolt or other securing mechanism may pass through the notch.

A washer 118 may also be included, such that the support member 106 extends through the washer 118, and thereafter through the hole 110 in the roller 102 and attaches with the rigid housing 104 to secure the foot peg 100 components together.

As can be appreciated by one in the art, the roller 102 can be formed of several materials, a non-limiting example of which includes being a bearing wrapped around the support member 106. As another non-limiting example, the roller 102 can be an elongated rod, thereby forming an elongated roller. When an elongated roller, the elongated roller is formed of any suitably durable material, non-limiting examples of which include being formed of ultra-high molecular weight polyethylene (UHMW), metal, Teflon, and plastic.

Figure 2:
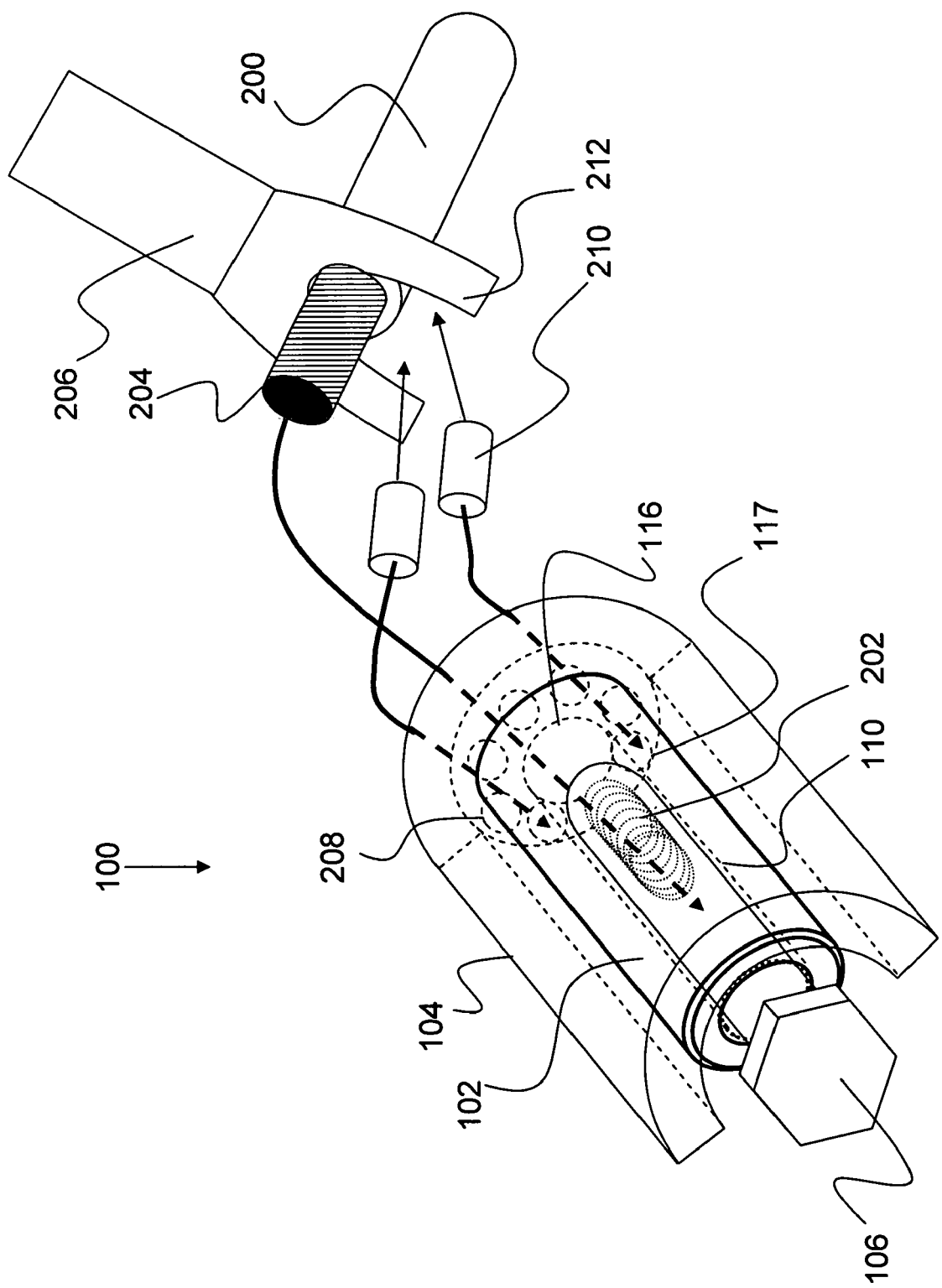
FIG. 2 is an illustration of a foot peg being attached with a cycle fork and axle according to the present invention.

As shown in FIG. 2, when inserted through the hole 110, the support member 106 holds the roller 102 in place and operates as an axle for the roller 102 to spin around. Additionally, the support member 106 is formed to be attached with a cycle's axle 200. The support member 106 may be an elongated nut with a receiving-end 202 for receiving a bolt therein, or an elongated bolt, depending upon the particular configuration of the cycle. For example, cycle's typically include an axle 200 and a male-end 204 extending beyond the cycle's fork 206. A nut is typically connected with the male-end 204 to secure the cycle's wheel (as attached with the axle 200) with the fork 206. When a traditional foot peg is attached, the foot peg housing typically operates as the nut, thereby securing the wheel against the fork. As applied to the present invention, in addition to functioning as an axle for the roller 102, the support member 106 also operates as a nut to secure both the foot peg 100 and the cycle's wheel to the fork 206.

In this aspect, a diameter of the support member 106 is greater than a diameter of the housing space 116. The housing space 116 diameter is greater than the male-end 204 diameter, allowing the male-end 204 to pass through the housing space 116, with the receiving-end 202 thereafter screwing onto the male-end 204. Because the support member 106 diameter is greater than the housing space 116 diameter, the support member 106 secures the rigid housing 104 and the foot peg 100 in place when attached with the male-end 204. As can be appreciated by one in the art, cycle axles may differ and the support member 106 and the diameters described herein can be varied to accommodate varying cycle axle configurations, yet still result in the foot peg 100 being securely attached against the fork 206.

In order to stabilize the foot peg 100 and prevent the rigid housing 104 from spinning around the support member 106, a foot peg stabilizer 208 may be included with the foot peg 100. The foot peg stabilizer 208 may be in the form of a hole, notch, groove, indentation, or bump, such that when the fork 206 is connected with a foot peg, the foot peg stabilizer 208 interacts with a corresponding anti-rotation device 208 to prevent the foot peg 100 and rigid housing 104 from rotating. For example, if the rigid housing 104 includes a foot peg stabilizer 208 in the form of a hole, the corresponding anti-rotation device 210 could be a peg pressed into the hole. Accordingly, the attachment portion 117 may optionally include at least one foot peg stabilizer 208 for engaging with the anti-rotation device 210. The anti-rotation device 210 is formed in any suitable shape or form to sufficiently engage with the foot peg stabilizer 208, non-limiting examples of which include being a peg, and a washer with a notch, groove, indentation, bump, or other markings and/or outcroppings (described in further detail below regarding FIGS. 8A and 8B). As shown in FIG. 2, when the foot peg 100 is attached with the fork 206, the anti-rotation device 210 in conjunction with the foot peg stabilizer 208 secure the rigid housing 104 in place and prevent it from spinning around the roller 102, thereby allowing a user to stand upon the foot peg 100. As illustrated in FIG. 2, the anti-rotation device 210 is placed between the fork-portion 212 of the fork 206 to prevent spinning.

In another aspect, the foot peg 100 includes only the roller 102 and the support member 106. In this aspect, using the support member 106, the roller 102 can be attached with the cycle fork 206, allowing a user to use the roller 102 to roll the cycle across an obstacle.

Figure 3:
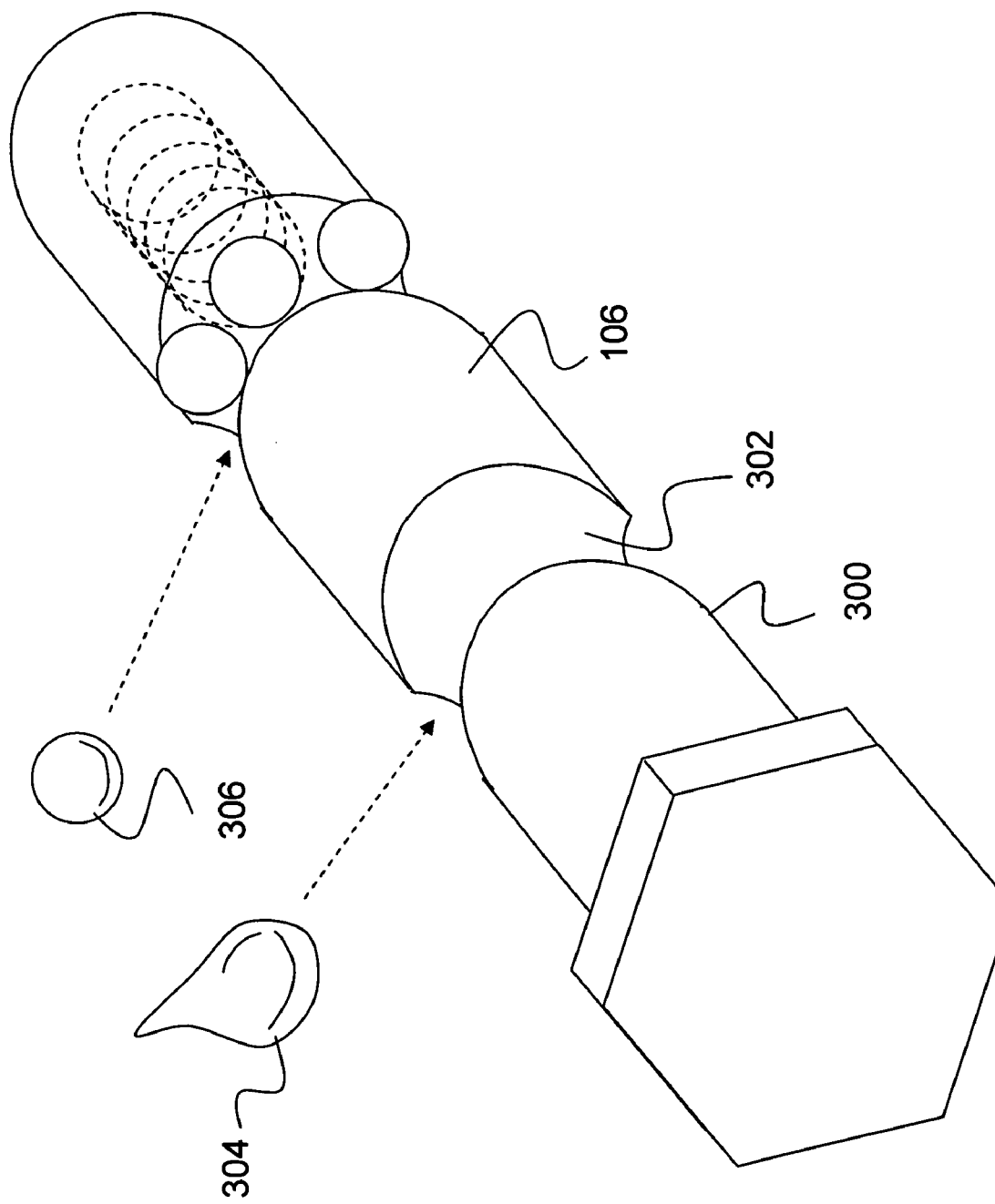
FIG. 3 is an illustration of a support member with a groove and bearings according to the present invention.

FIG. 3 illustrates another aspect of the support member 106. In this aspect, the support member 106 includes an outer surface 300 with at least one groove 302 notched in the outer surface 300, such that the groove 302 travels around the circumference of the outer surface 300. An item may be placed within the groove 302 to aid an attached roller in rotating around the support member 106. The item is a suitable item that functions to decrease friction between two objects, non-limiting examples of which include a lubricant 304 and a ball bearing 306. For example, a plurality of ball bearings 306 may be placed within the groove 302, with the roller thereafter slid over the support member 106. With the ball bearings 306 (or other suitable item) in place, the roller will roll more efficiently around the support member 106 and thereby better maintain speed when a user is rolling the foot peg along a surface.

Figure 4:
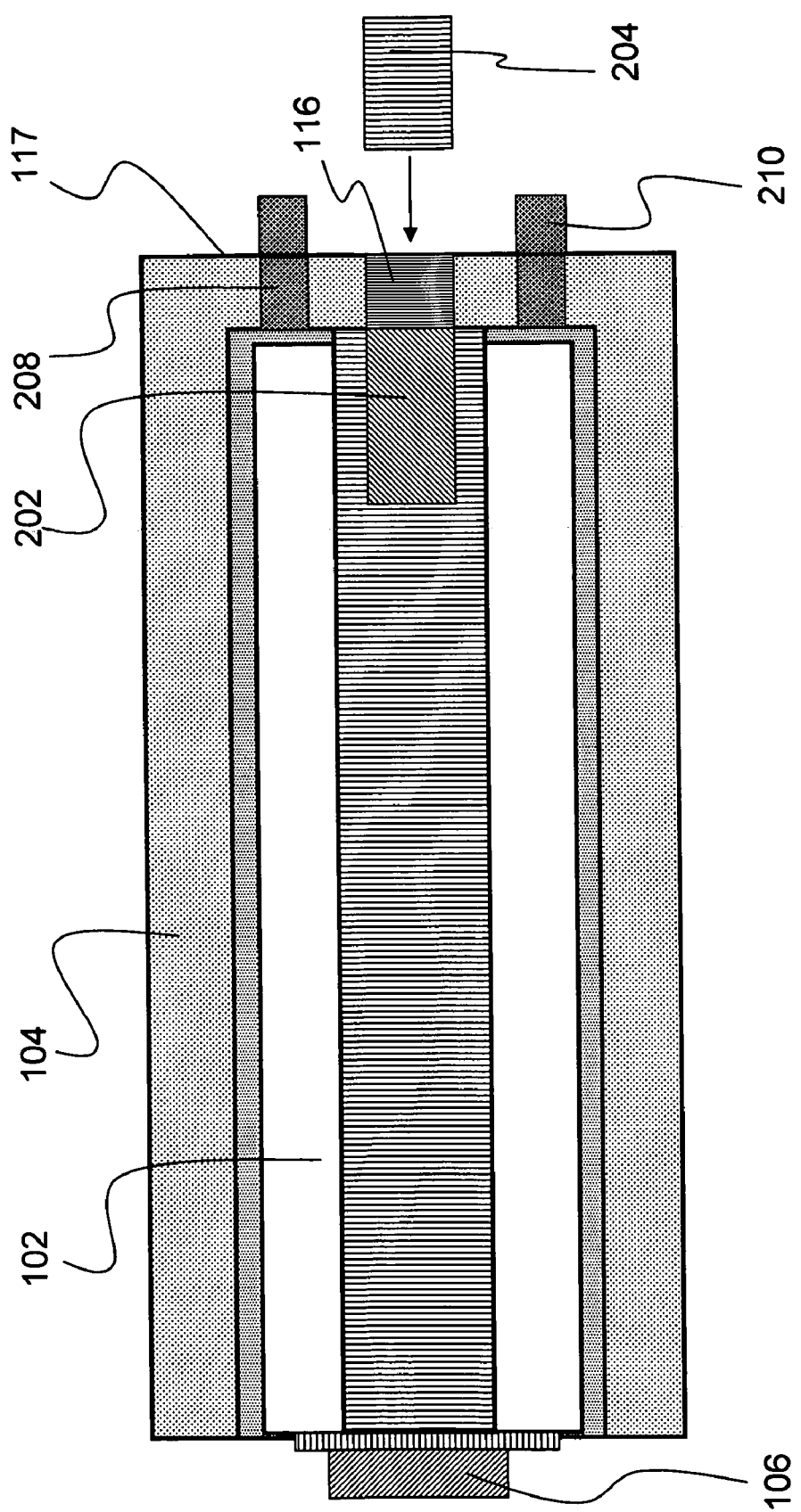
FIG. 4 is a cross-sectional bottom-view illustration of a foot peg according to the present invention.

FIG. 4 illustrates a cross-sectional bottom-view of a foot peg 100. As shown in FIG. 4, a portion of the roller 102 is encased by the rigid housing 104. The support member 106 is formed to pass through the roller 102 and secure against the attachment portion 117. The attachment portion 117 includes a housing space 116, where the male-end 204 may pass through the housing space 116 and thereafter be screwed into the receiving-end 202. Also shown are a plurality of anti-rotation devices 210 connected with the foot peg stabilizer 208 for placement between the fork.

Figure 5:
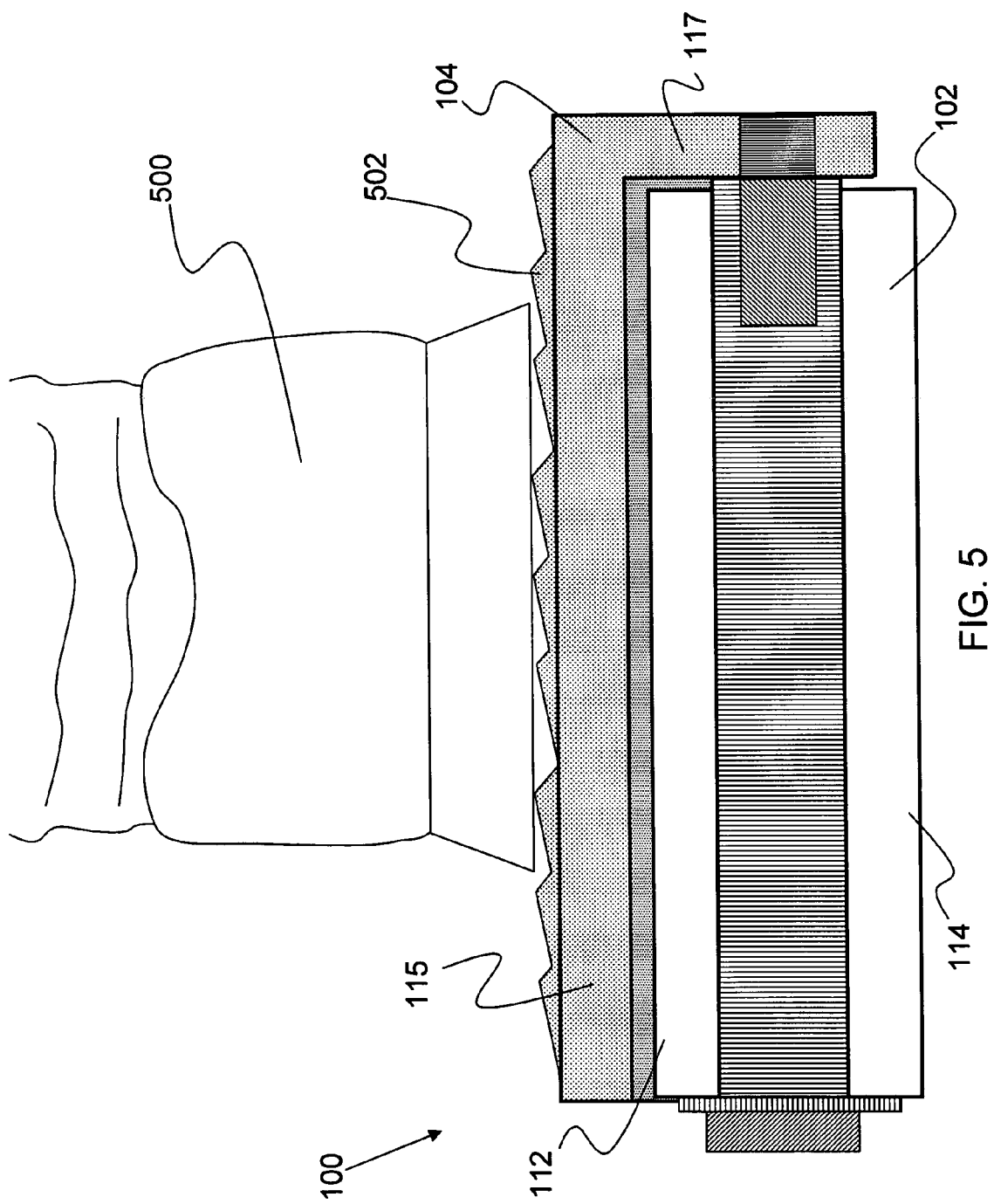
FIG. 5 is cross-sectional side-view illustration of a foot peg according to the present invention.

FIG. 5 illustrates a cross-sectional side-view of a foot peg 100. As shown in FIG. 5, the rigid housing 104 is elongated to allow a user 500 to stand upon the rigid housing 104, and is formed of a material (such as metal) rigid enough to support the weight of a user 500. Also shown in FIG. 5 are the various portions of the roller 102. The rigid housing 104 is formed such that it covers a covered portion 112 of the roller 102, leaving an uncovered portion 114 of the roller 102 exposed. By leaving the uncovered portion 114 exposed, the roller 102 is capable of engaging with a surface. For example, when the foot peg 100 is attached with a cycle, a user may desire to roll the cycle and attached foot peg 100 across a curb. The uncovered portion 114 of the roller 102 would then engage with the curb to reduce friction and allow the cycle to easily roll along the curb. Also shown in FIG. 5 is the relationship between the foot portion 115 and the attachment portion 117. The foot portion 115 includes an outer gripping surface 502 for engaging with a user's foot 500 to prevent slippage. The outer gripping surface 502 is formed of a suitable material or in a suitable form, to increase friction. As a non-limiting example, coarse raised sections may be formed in the rigid housing 104 to enhance gripping properties of the foot peg 100. As another non-limiting example, grip-tape may be attached to the rigid housing 104.

Figure 6:
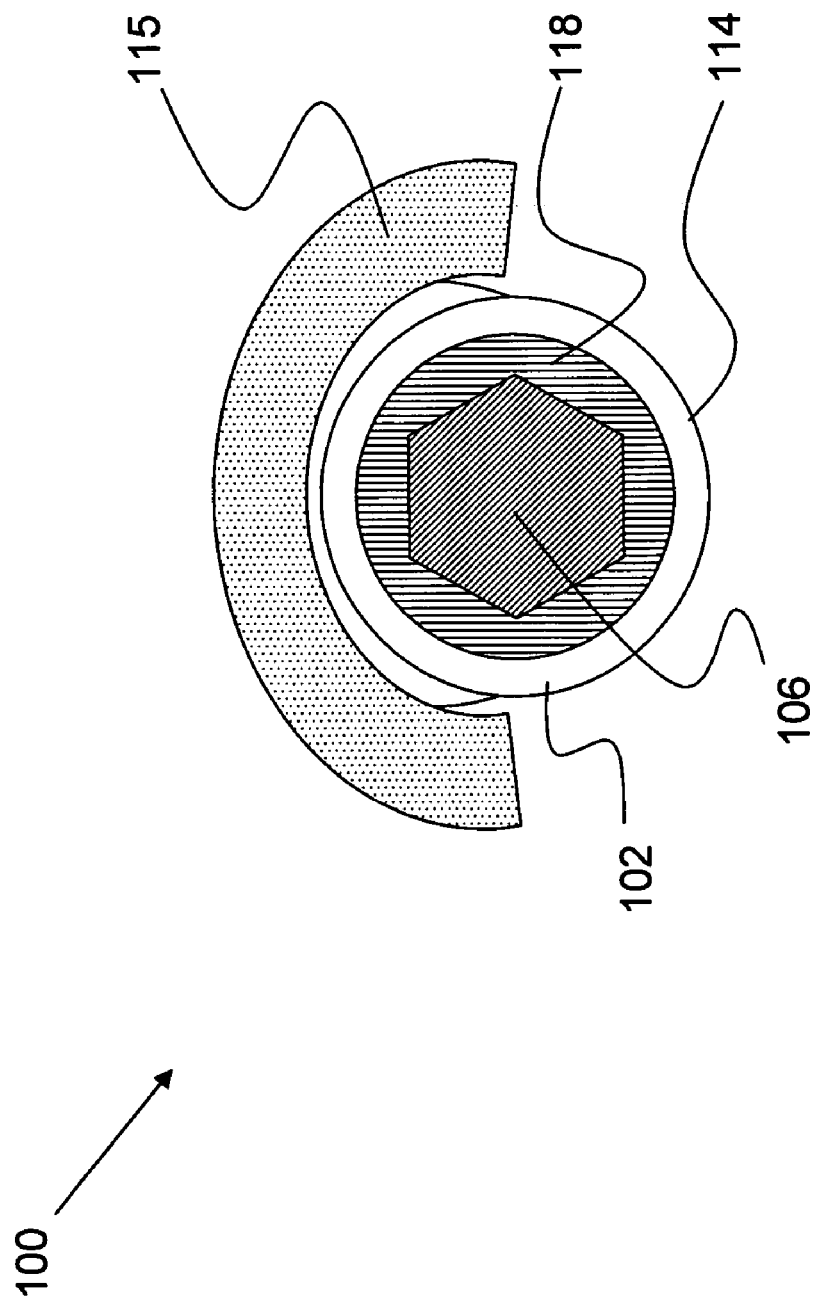
FIG. 6 is a front-view illustration of a foot peg according to the present invention.

FIG. 6 illustrates a front-view of a foot peg 100. As shown in FIG. 6, the uncovered portion 114 of the roller 102 extends beyond the top portion 115 of the rigid housing 104. Also shown is the diameter of the washer 118 compared to the diameter of the roller 102. The diameter of the roller 102 is greater than the diameter of the washer 118, allowing the foot peg 100 to be unimpeded by the washer 118 when rolling across a surface. To assist in tightening the support member 106 against the rigid frame 104 and a cycle fork, the support member 106 may include a tightening-aid configuration. As shown in FIG. 6, an end of the support member 106 may include a hexagonal shape to conform to standard ratchet sockets. As another non-limiting example, the tightening-aid configuration may be an Allen wrench fitting, or a standard screwdriver fitting.

Additionally, the rigid housing 104 may be formed in a variety of shapes to allow a user to stand thereon, yet still leave a portion of the roller uncovered 114. As a non-limiting example and as shown in FIG. 6, the rigid housing 104 may be formed with an arcuate shape to wrap around the roller 102. In a preferred aspect, the rigid housing 104 is formed such that it encases and covers at least fifty percent of the roller 102. In this aspect, the rigid housing 104 includes a sufficient area for placing a foot, while leaving a large area of the roller 102 uncovered.

In another aspect (not shown), the rigid housing 104 may be flat, providing a planar surface area for standing upon, yet leaving almost the entire roller 102 uncovered.

Figure 7:
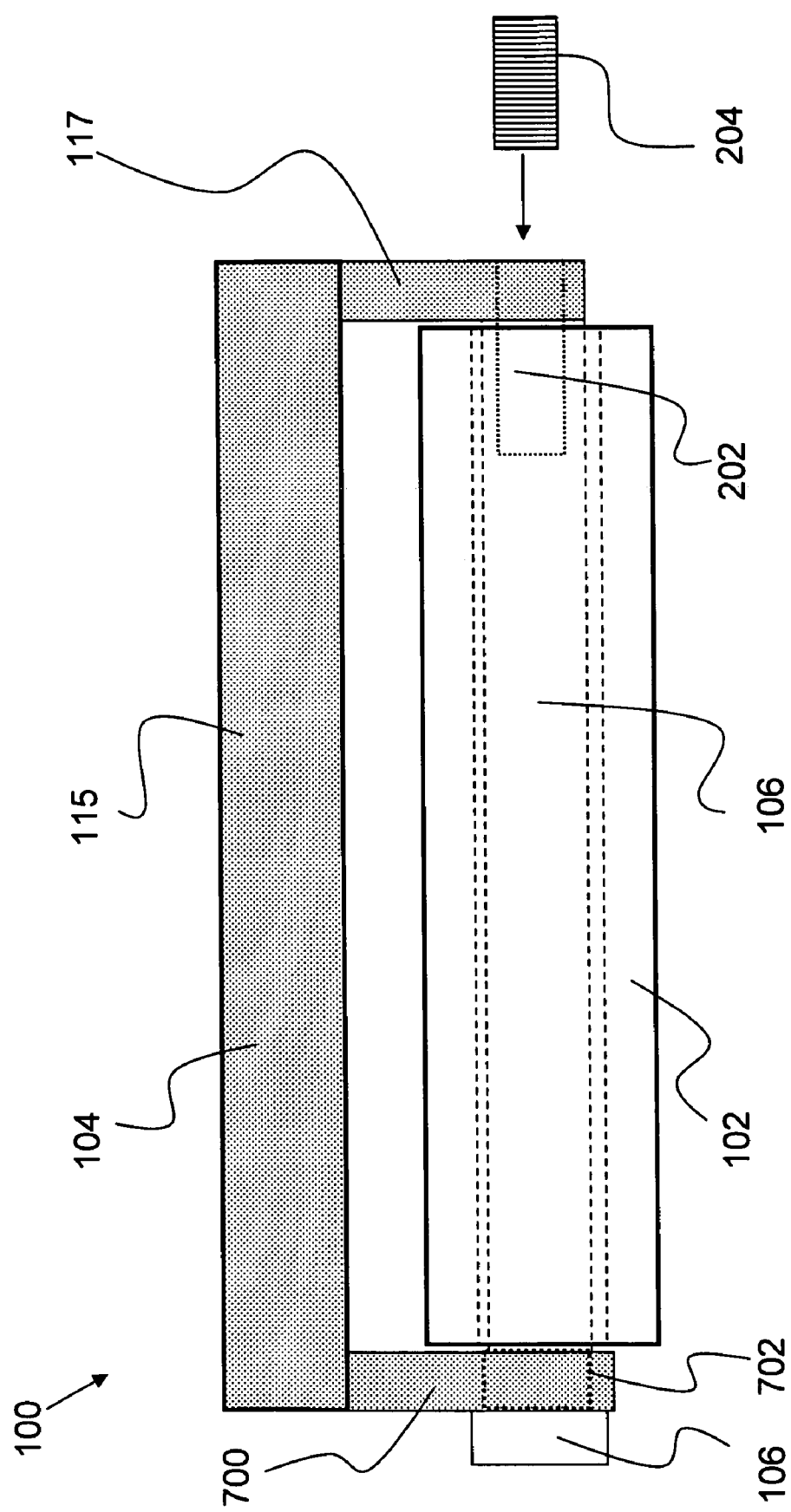
FIG. 7 is a side-view illustration of another aspect of a foot peg according to the present invention.

FIG. 7 is a side-view illustration of another aspect of a foot peg 100. In this aspect, the rigid housing 104 includes the attachment portion 117, the foot portion 115, and an outer portion 700. The outer portion 700 can be a post or other extension of the rigid housing 104. The outer portion 700 includes a hole 702 to allow the support member 106 to pass through the hole 702 and thereafter through the roller 102. Once in place, the male-end 204 of the cycle axle may pass through the attachment portion 117 and thereafter be screwed into the receiving-end 202 of the support member 106. When attached with a cycle, the outer portion 700 provides the foot peg 100 with additional support and ensures that weight from a user will not force the foot portion 115 to rub against the roller 102.

Figure 8:
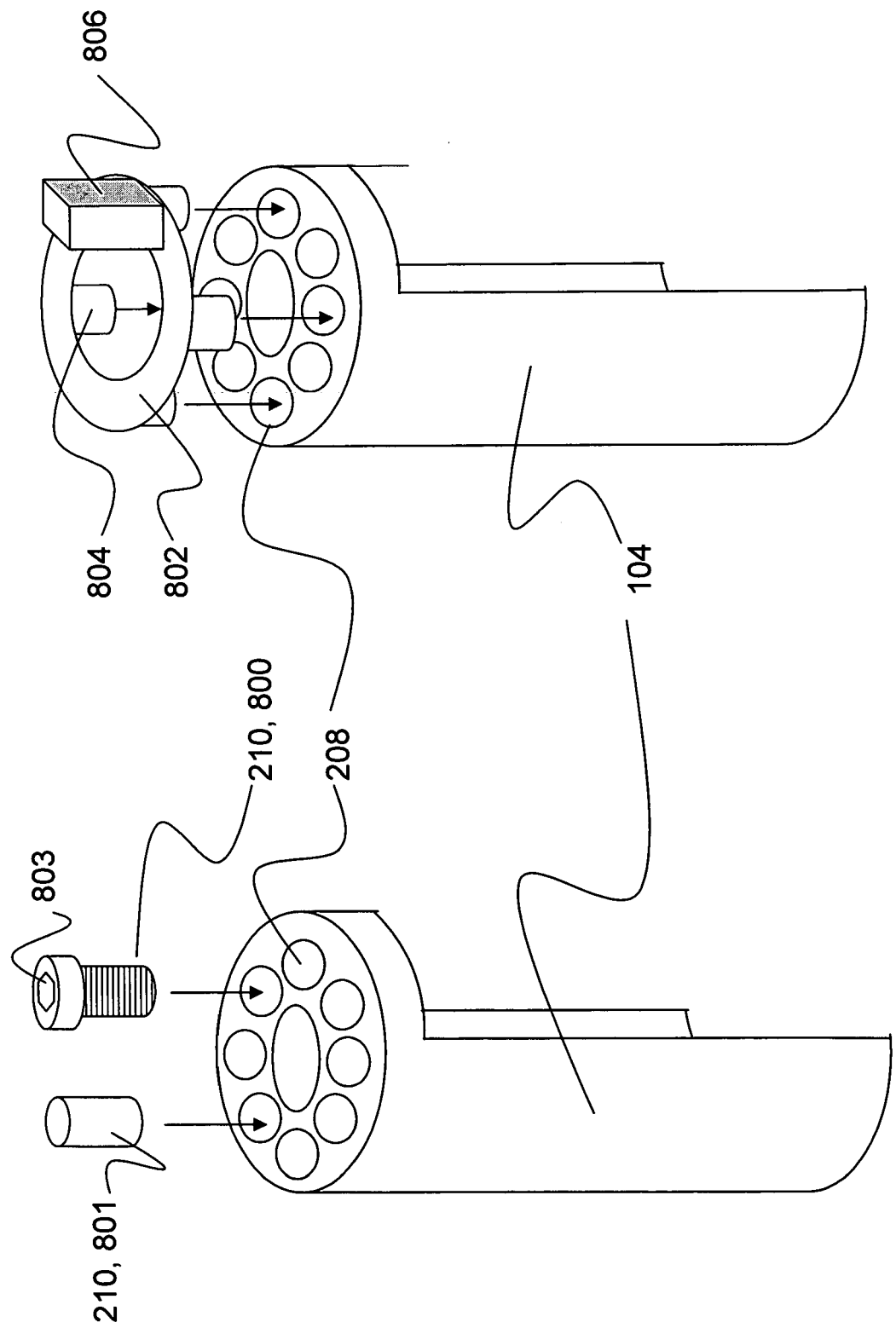
FIG. 8A is a side-view illustration of a rigid housing with a foot-peg stabilizer according to the present invention.
FIG. 8B is a side-view illustration of a rigid housing with another aspect of a foot-peg stabilizer according to the present invention.

FIG. 8A illustrates a foot peg stabilizer 208 and corresponding anti-rotation device 210. As discussed above, the foot peg stabilizer 208 may be in the form of a hole, notch, groove, indentation, or bump, such that when the fork 206 is connected with a foot peg, the foot peg stabilizer 208 interacts with a corresponding anti-rotation device 208 to prevent the foot peg and rigid housing 104 from rotating. In the example shown in FIG. 8A, the foot peg stabilizer 208 is a plurality of holes, allowing the anti-rotation device 210 to be placed in the desired hole. The plurality of holes are included because it is desirable to be able to position the housing 104 at different angles with respect to the fork (because both the front and rear forks approach the cycle axle at different angles). The anti-rotation device 210 is any suitable device for interacting with both the foot peg stabilizer 208 and the cycle's fork, thereby preventing rotation therebetween. As shown in FIG. 8A, the anti-rotation device 210 can be a peg 801 or threaded rod (such as a threaded bolt 800) to be placed within the foot peg stabilizer 208. For example, the anti-rotation device 210 can be a threaded bolt 800 to be threaded into corresponding threads on the foot peg stabilizer 208. When in the form of a threaded bolt 800, it may include a suitable grasping configuration 803 to enable tightening of the threaded bolt 800, such as being an allen screw indentation, hexagonal head bolt, standard screwdriver indentation, etc.

FIG. 8B illustrates another aspect of the anti-rotation device 210. As shown in FIG. 8B, the anti-rotation device 210 can be a circular disc 802 (such as a washer) with a plurality of outcroppings 804 for engaging with the foot peg stabilizer 208 (e.g., holes or indentations). The anti-rotation device 210 in this aspect would further include an anti-rotation tab 806 for placement between the fork-portion of the fork. Using the anti-rotation device 210 shown in FIG. 8B, a user may position the device 210 in the desired location (i.e., placing the outcroppings 804 in the desired foot peg stabilizer 208 holes), then secure the foot peg against the fork using the support member, with the anti-rotation tab 806 placed between the fork-portion. To adjust the angle of the foot peg, a user would loosen the support member from the cycle axle, reposition the anti-rotation device 210 to align with the outcroppings 804 with the desired foot peg stabilizer 208 (e.g., holes), then retighten the support member and rigid housing 104 against the fork.

Figure 9:
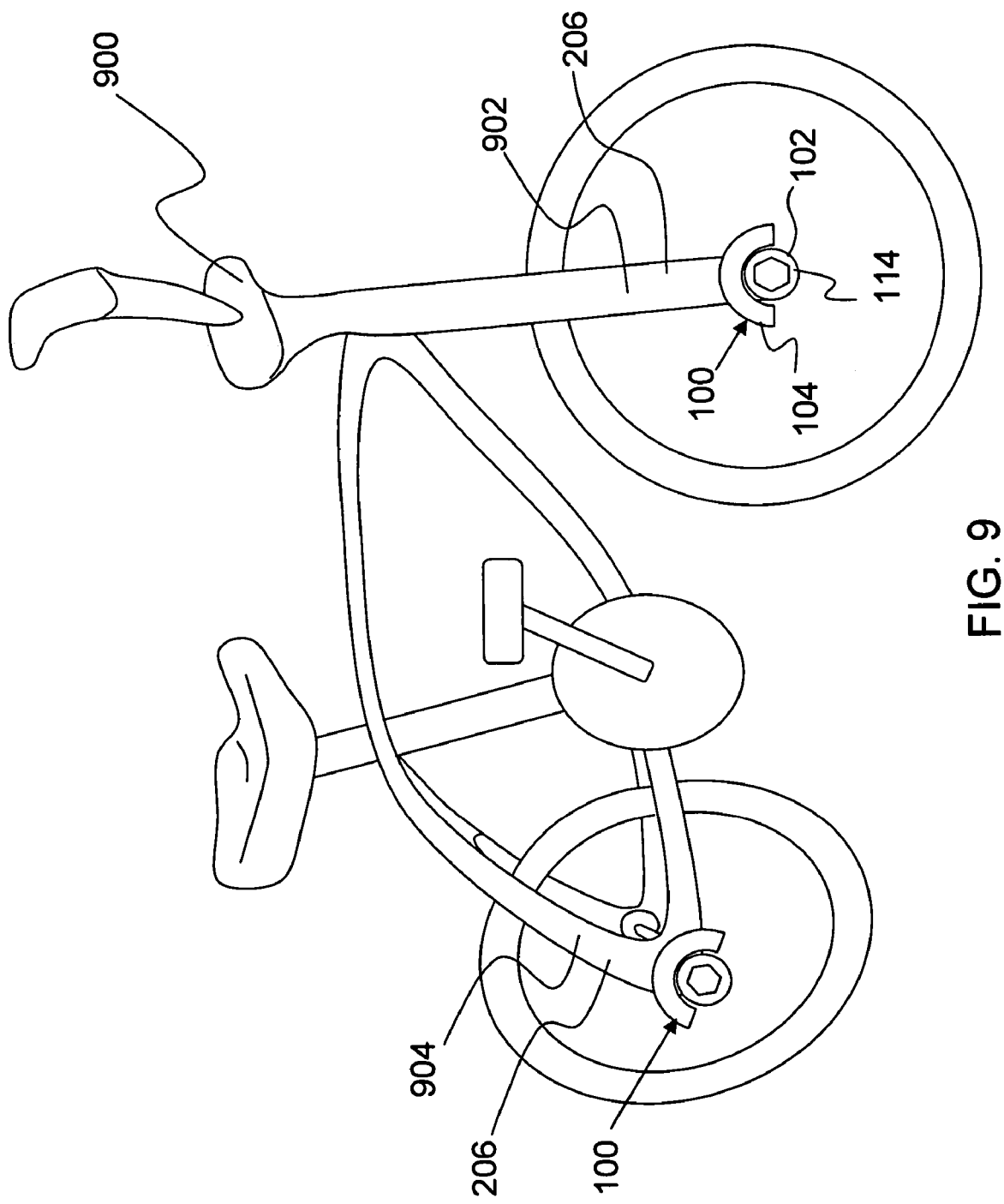
FIG. 9 is an illustration of a foot peg attached with a cycle according to the present invention.

For further illustration, shown in FIG. 9 are a set of foot pegs 100 attached with a cycle 900. As shown, the foot pegs 100 attach with the cycle's 900 fork 206 and may be connected with both the front 902 and back 904 forks. Additionally, when the foot peg 100 is attached with the cycle 900, a user may stand upon the rigid housing 104 or use the uncovered portion 114 of the roller 102 to roll the cycle 900 across an obstacle.

What is claimed is:

1. A foot peg for attaching with a cycle, the foot peg comprising:
   a roller having an axial length with a hole passing through the roller along the axial length;
   a support member for extending through the hole of the roller and attaching with a cycle, whereby when the foot peg is attached with a cycle, the roller is attached proximate the cycle and a user may use the uncovered portion of the roller to roll the cycle across an obstacle.

2. A foot peg as set forth in claim 1, further comprising a rigid housing for attaching with a cycle and covering a portion of the roller, the rigid housing formed such that the support member may be attached with the rigid housing, thereby attaching the roller proximate the rigid housing, such that when attached, the rigid housing covers a covered portion of the roller, leaving an uncovered portion of the roller exposed, whereby when the foot peg is attached with a cycle, a user may stand upon the rigid housing or use the uncovered portion of the roller to roll the cycle across an obstacle.

3. A foot peg as set forth in claim 2, wherein the roller is an item selected from a group consisting of a bearing and an elongated roller.

4. A foot peg as set forth in claim 3, wherein when an elongated roller, the elongated roller is formed of a material selected from a group consisting of ultra-high molecular weight polyethylene (UHMW), metal, Teflon, and plastic.

5. A foot peg as set forth in claim 4, wherein the support member is an elongated nut with a receiving-end for receiving a bolt therein.

6. A foot peg as set forth in claim 5, wherein the rigid housing is formed such that it encases and covers at least fifty percent of the roller.

7. A foot peg as set forth in claim 6, wherein the rigid housing includes a foot portion and an attachment portion attached substantially perpendicularly to the foot portion, where the attachment portion includes a space for a bolt to pass therethrough to be attached with the support member, thereby securing the foot peg with the cycle.

8. A foot peg as set forth in claim 7, wherein the foot portion includes an outer gripping surface for engaging with a user's foot to prevent slippage.

9. A foot peg as set forth in claim 8, wherein the attachment portion further includes at least one foot peg stabilizer for connecting with an anti-rotation device, where the anti-rotation device is for connecting with a fork of a cycle, such that when connected with the anti-rotation device and the fork, the rigid housing is secured in place and prevented from spinning around the roller.

10. A foot peg as set forth in claim 9, further comprising an anti-rotation device for interacting with the foot peg stabilizer and the fork of a cycle.

11. A foot peg as set forth in claim 10 wherein the support member includes an outer surface with at least one groove.

12. A foot peg as set forth in claim 11, further comprising at least one item placed within the at least one groove, the at least one item selected from a group consisting of a lubricant and a bearing.

13. A foot peg as set forth in claim 1, wherein the support member is an elongated nut with a receiving-end for receiving a bolt therein.

14. A foot peg as set forth in claim 2, wherein the rigid housing is formed such that it encases and covers at least fifty percent of the roller.

15. A foot peg as set forth in claim 2, wherein the rigid housing includes a foot portion and an attachment portion attached substantially perpendicularly to the foot portion, where the attachment portion includes a space for a bolt to pass therethrough to be attached with the support member, thereby securing the foot peg with the cycle.

16. A foot peg as set forth in claim 15, wherein the foot portion includes an outer gripping surface for engaging with a user's foot to prevent slippage.

17. A foot peg as set forth in claim 15, wherein the attachment portion further includes at least one foot peg stabilizer for connecting with an anti-rotation device, where the anti-rotation device is for connecting with a fork of a cycle, such that when connected with the anti-rotation device and the fork, the rigid housing is secured in place and prevented from spinning around the roller.

18. A foot peg as set forth in claim 15, further comprising an anti-rotation device for attaching with the attachment portion and interacting with a cycle's fork.

19. A foot peg as set forth in claim 1, wherein the roller is an item selected from a group consisting of a bearing and an elongated roller.

20. A foot peg as set forth in claim 19, wherein when an elongated roller, the elongated roller is formed of a material selected from a group consisting of ultra-high molecular weight polyethylene (UHMW), metal, Teflon, and plastic.

21. A foot peg as set forth in claim 1, wherein the support member includes an outer surface with at least one groove.

22. A foot peg as set forth in claim 21, further comprising at least one item placed within the at least one groove, the at least one item selected from a group consisting of a lubricant and a bearing.

23. A method for using a foot peg, the method comprising acts of:
- passing a support member through a hole in a roller, where the roller has an axial length with the hole passing through the roller along the axial length;
- attaching the support member with a cycle axle, thereby attaching the roller proximate the cycle, whereby when the foot peg is attached with a cycle, a user may use the roller to roll the cycle across an obstacle.

24. A method for using a foot peg as set forth in claim 23, further comprising an act of positioning and attaching the roller and support member proximate a rigid housing prior to attaching the support member with the cycle axle, where the rigid housing is formed such that when attached proximate the roller, it covers a covered portion of the roller, leaving an uncovered portion of the roller exposed, whereby when the foot peg is attached with a cycle, a user may stand upon the rigid housing or use the uncovered portion of the roller to roll the cycle across an obstacle.

25. A kit for building a foot peg, the kit comprising:
- a roller having an axial length with a hole passing through the roller along the axial length;
- a support member for extending through the hole of the roller and attaching with a cycle, whereby when the foot peg is attached with a cycle, the roller is attached proximate the cycle and a user may use the roller to roll the cycle across an obstacle.

26. The kit for building a foot peg as set forth in claim 25, further comprising a rigid housing for attaching with a cycle and covering a portion of the roller, the rigid housing formed such that the support member may be attached with the rigid housing, thereby attaching the roller proximate the rigid housing, such that when attached, the rigid housing covers a covered portion of the roller, leaving an uncovered portion of the roller exposed, whereby when the foot peg is attached with a cycle, a user may stand upon the rigid housing or use the uncovered portion of the roller to roll the cycle across an obstacle.

27. A method for forming a foot peg for attaching with a cycle, the method comprising acts of:
- forming a roller, where the roller has an axial length with a hole passing through the roller along the axial length;
- forming a support member for attaching with a cycle axle and passing through the hole, whereby when the foot peg is attached with a cycle, a user may use the roller to roll the cycle across an obstacle.

28. A method for forming a foot peg as set forth in claim 27, further comprising an act of forming a rigid housing for attaching with the support member, where the rigid housing is formed such that when attached proximate the roller, it covers a covered portion of the roller, leaving an uncovered portion of the roller exposed, whereby when the foot peg is attached with a cycle, a user may stand upon the rigid housing or use the uncovered portion of the roller to roll the cycle across an obstacle.

* * * * *